United States Patent [19]

Espana

[11] 4,226,191
[45] Oct. 7, 1980

[54] REMOTELY CONTROLLED ROLLER PLATFORM FOR USE IN A VISUAL AID SYSTEM

[75] Inventor: Guillermo A. Espana, Hialeah, Fla.

[73] Assignee: University of Miami, Coral Gables, Fla.

[21] Appl. No.: 14,592

[22] Filed: Feb. 26, 1979

[51] Int. Cl.² ............................................. A47B 85/00
[52] U.S. Cl. ..................................... 108/20; 33/1 M; 248/430; 248/651
[58] Field of Search ............ 108/20; 33/1 M; 269/61, 269/68, 71, 60; 248/429, 430, 651; 74/89.17; 51/165.8, 240 R; 308/3 R

[56] References Cited

U.S. PATENT DOCUMENTS

| | | | |
|---|---|---|---|
| D. 241,981 | 10/1976 | Miller | 33/1 M X |
| 2,412,017 | 12/1946 | Taylor et al. | 51/240 R |
| 2,933,022 | 4/1960 | Stark | 51/240 R |
| 3,495,519 | 2/1970 | Alfsen et al. | 108/20 X |
| 3,897,659 | 8/1975 | Henry | 51/165.71 |
| 3,918,167 | 11/1975 | Gerber | 33/1 M X |
| 4,113,223 | 9/1978 | Kakizaki | 248/430 |

FOREIGN PATENT DOCUMENTS 1152829 7/1959 Fed. Rep. of Germany ........... 33/1 M
564 of 1879 United Kingdom ...................... 33/1 M

*Primary Examiner*—Roy D. Frazier
*Assistant Examiner*—Peter A. Aschenbrenner
*Attorney, Agent, or Firm*—Meredith P. Sparks

[57] ABSTRACT

A remotely controlled tri-level roller platform assembly including a base portion, an intermediate portion and a top support portion. The intermediate portion is reciprocally operable in a first linear plane, atop and independently of the base member, by means of a first reversible electric motor, with the top support portion disposed thereatop for movement therewith. The top support portion is reciprocally operable in a second linear plane, independent of the intermediate portion, at right angles to the first plane, by means of a second reversible electric motor. Remote control electric switches are provided for the first and second motors whereby the motors may be selectively operated for universal planar positioning of any desired point within a predetermined area of the top surface of the top support portion relative to the lens of a single camera in a visual aid system, including a TV monitor.

5 Claims, 6 Drawing Figures

REMOTELY CONTROLLED ROLLER PLATFORM FOR USE IN A VISUAL AID SYSTEM

BACKGROUND OF THE INVENTION

The present invention pertains to a remotely controlled roller platform, having a top support portion for books, magazines, catalogs or any other applicable printed matter. When incorporated in a visual aid system, including a single conventional camera and a TV monitor, a piece of printed matter is placed atop the platform with the camera properly positioned thereabove and the movements of the platform are remotely controlled in a manner whereby the exposed printed matter may be completely sequentially scanned by the camera in a manner whereby it may be viewed on a greatly enlarged scale on the screen of the monitor.

The device provides a very substantial degree of assistance to persons with varying types and degrees of visual defects. The remote control device is preferably in the form of four electric remote control switches mounted in a box, for foot operation by the user, to control two reversible gear motors to position the platform assembly, leaving both hands free to operate a typewriter, for example, or for any other purpose while viewing the printed matter on the screen of a monitor on a greatly enlarged scale.

Therefore, one of the principal objects of the present invention is to provide a remotely controlled roller platform comprised of a base portion, an intermediate portion and a top platform portion to receive a piece of printed matter, disposed relative to a conventional camera means for transmitting substantially enlarged images of the printed matter to a TV monitor, positioned for viewing by the user.

Another object of the invention is to provide the intermediate portion with a trolley roller means and a reversible gear motor in driving connection therewith to provide for controlled reciprocating movement thereof in a first linear plane with the top support portion disposed thereon for movement therewith.

A further object of the invention is to provide the top support portion with a trolley roller means, and a second reversible gear motor in driving connection therewith to provide for controlled reciprocating movement thereof in a second linear plane, at right angles to said first linear plane.

Yet another object of the invention is to provide a remote control switch box in electrical connection from a source to the two reversible gear motors.

DETAILED DESCRIPTION OF A PREFERRED EMBODIMENT

Figure 1:
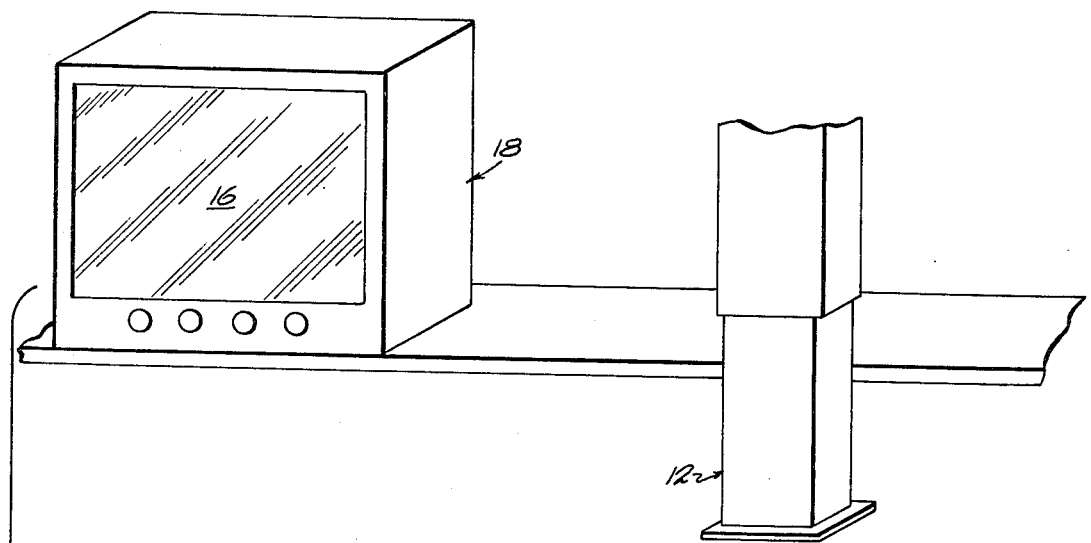
FIG. 1 is a perspective view of the roller platform and remote control switch box of the present invention relative to a camera and a TV monitor.
Figure 1:
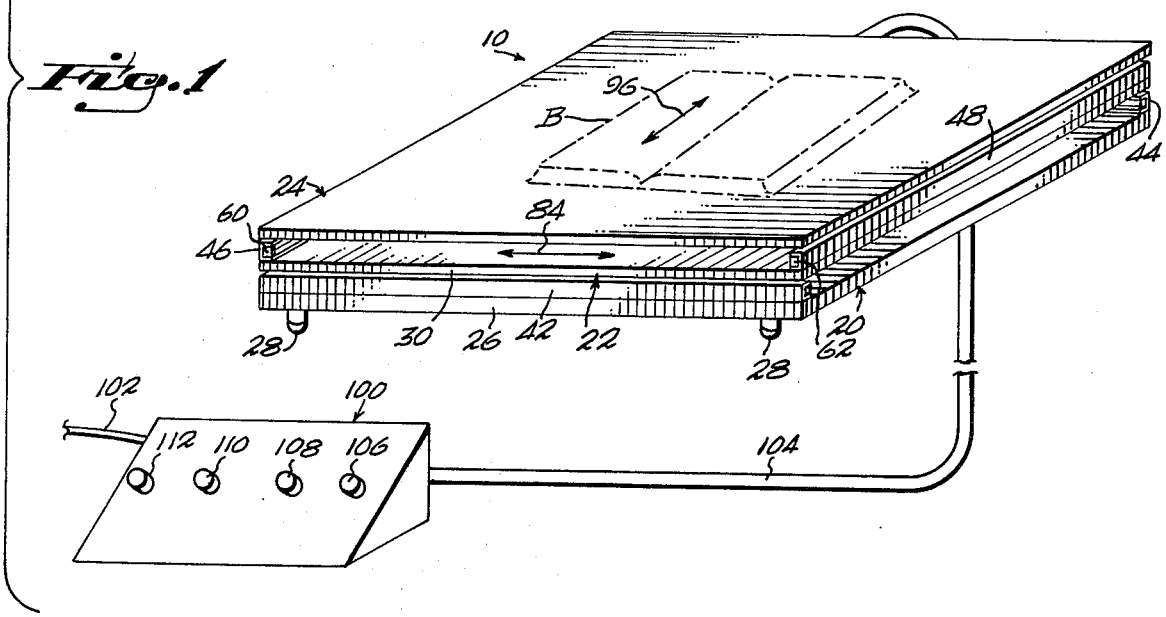

With reference to the drawings in which like reference characters designate like or corresponding parts throughout the various views, and with particular reference to FIG. 1, the remotely controlled roller platform, indicated generally at 10, is disposed relative to the lens of a camera, 12 which transmits enlarged images of printed matter of any type, disposed thereon, to the screen 16 of a TV monitor 18.

Figure 3:
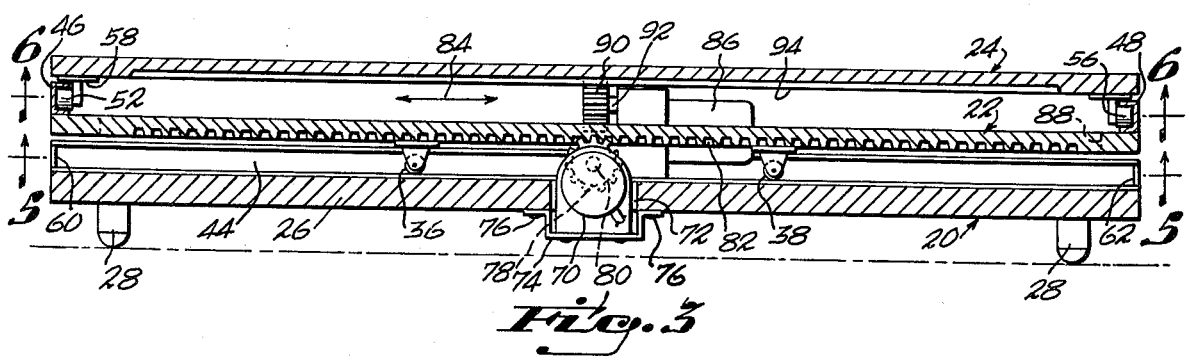
FIG. 3 is a longitudinal vertical sectional view taken along line 3—3 of FIG. 2.
Figure 4:
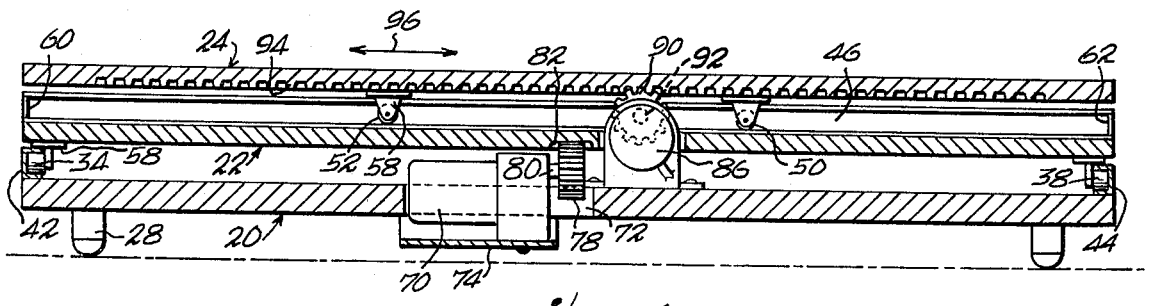
FIG. 4 is a transverse vertical sectional view taken along line 4—4 of FIG. 2.

As best illustrated in FIGS. 1, 3 and 4, the platform 10 includes a base portion 20, an intermediate portion 22 and a top support portion 24 with printed material such as that contained in a book B disposed thereon relative to camera 12. The base portion 20 is preferably in the form of a generally rectangular plate 26 with a short support leg 28 fixed to the underside of each corner portion thereof for engagement upon a table, desk top or the like.

The intermediate portion 22 is formed of a generally rectangular plate 30 with pairs of trolley rollers 32, 34 and 36, 38, journaled to brackets 40, fixed to respective undersides of front and back edge portions of intermediate portion 22. The pair of rollers 32, 34 are engaged within a channel track 42 fixed in any conventional manner such as by screws, rivets, etc. (not shown) along a top front edge portion of base 20. Rollers 36, 38 are similarly engaged within a second channel track 44 similarly fixed along a top rear edge portion of base 20. It can, therefore, be seen (FIG. 3) that the intermediate portion 22 is longitudinally movable in channel tracks 42, 44 relative to base portion 20.

A similar pair of transversely extending channel tracks 46, 48 are fixed along the opposed top lateral edges of intermediate portion 22 for rolling engagement by respective pairs of trolley rollers 50, 52 and 54, 56 carried by pairs of brackets 58 fixed to respective undersides of the opposed lateral edges of top support portion 24 to permit transverse movement of top portion 24 relative to intermediate portion 22.

The amount of both the longitudinal and transverse movements is predetermined by the spacing between the respective pairs of rollers relative to central portions of the intermediate and top portions 22, 24. For example, as seen in FIG. 3, the central spaced relationship between trolley rollers 36, 38 determines the amount of longitudinal movement of intermediate portion 22 in either direction before a roller 36 or 38 contacts a track end closure 60 or 62. If desired, one of the end closures 60 or 62 may be removable (not shown) to permit disassembly of the three portions 20, 22 and 24.

As best illustrated in FIG. 3, a first reversible gear motor 70 is mounted through a hole 72 in base portion 20 to a bracket 74, fixed to the underside of base portion 20 as at 76. A pinion gear 78, fixed to the motor shaft 80 is in engagement with a longitudinally extending gear rack 82, formed integral with or fixed to the underside of intermediate portion 22 to impart longitudinal movement to said intermediate portion 22 in either direction as indicated by the double arrow 84 in FIGS. 1 and 3. It is to be noted that top support portion 24 travels longitudinally with intermediate portion 22.

Figure 2:
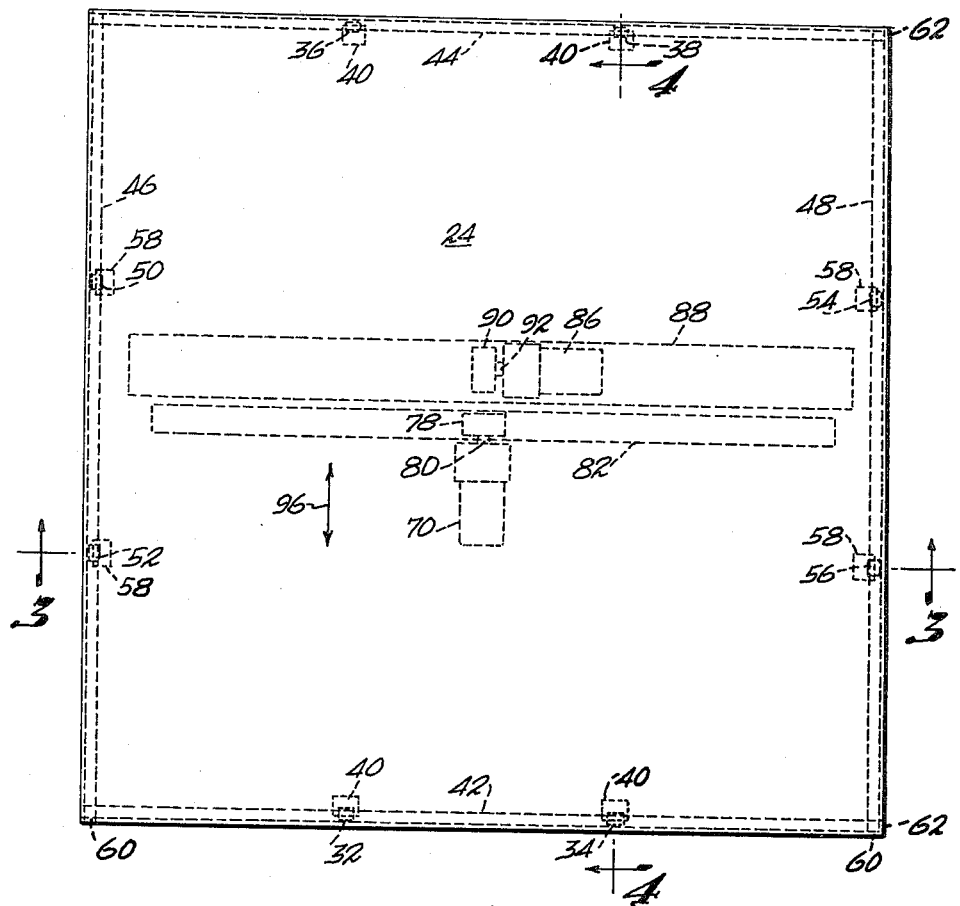
FIG. 2 is a top plan view of the platform of FIG. 1.
Figure 5:
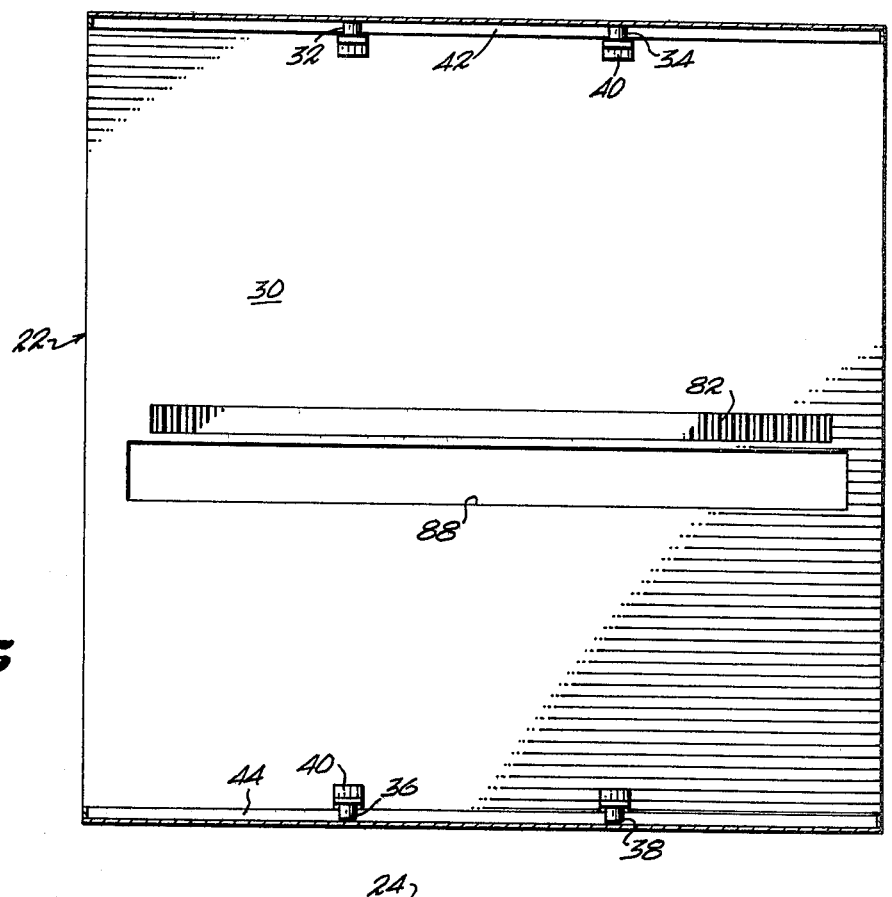
FIG. 5 is a bottom view of the intermediate platform position as seen along line 5—5 of FIG. 3.
Figure 6:
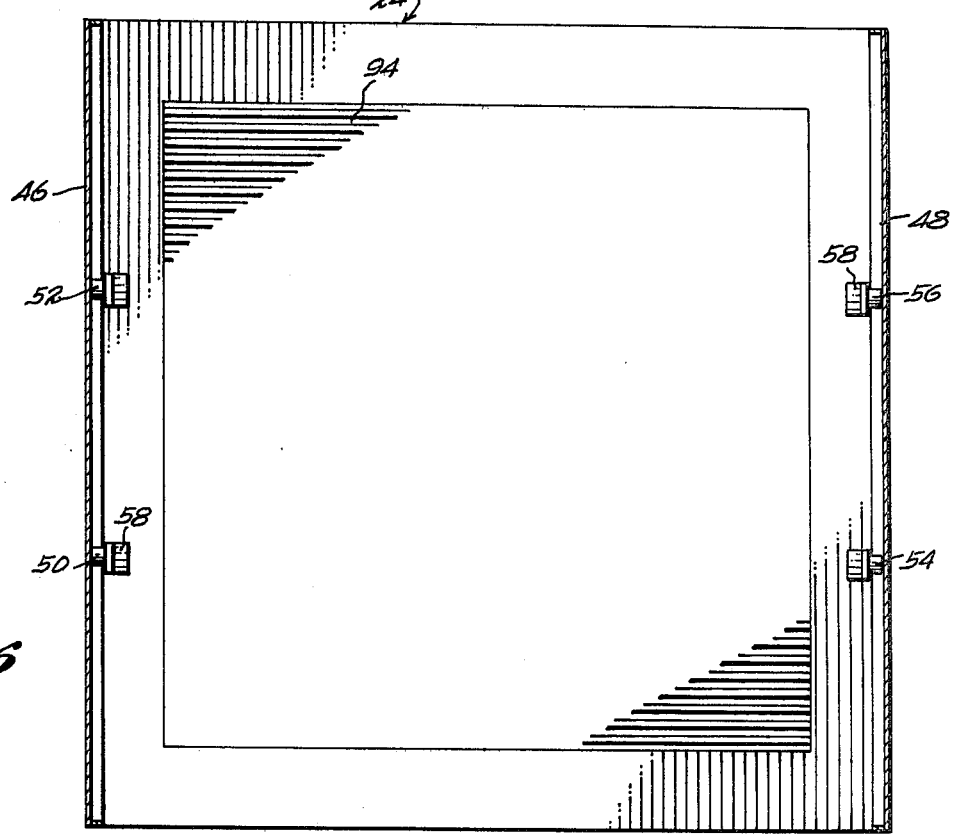
FIG. 6 is a bottom view of the top support portion of the platform as seen along line 6—6 of FIG. 3.

A second reversible gear motor 86 is fixed to base portion 20 through a longitudinal slot 88 in intermediate portion 22, FIGS. 2 and 5, with a pinion gear 90 fixed to its output shaft 92 in driving engagement with a laterally extending gear rack 94 formed integral with or fixed to the underside of top support portion 24, FIGS. 3, 4 and 6. The gear rack 94 encompases a very substantial portion of the underside of top support portion 24 to accomodate the lateral or transverse driving engagement with pinion gear 90, indicated by double arrow 96, FIGS. 1, 2 and 4, throughout the length of its longitudinal movement with intermediate portion 22. For production purposes, the entire underside of top support portion 24 may comprise gear rack 94.

The remote control box 100 is connected from an electrical supply source through a conduit 102 to the platform assembly 10 by a flexible conduit 104 which carries the wires to both reversible gear motors 70 and 86 as illustrated in FIG. 1. Electric switches 106, 108, 110, and 112 provided in box 100 may be arranged as desired. For example, switches 106, 108 may be operably connected through conduit 104 to gear motor 70 with switch 106 operating the motor 70 to drive the intermediate and top portions 22, 24 to the right as seen in FIG. 1 with switch 108 reversing motor 70 to drive them to the left. Switch 110 may operate the motor 86 to move the top support portion 24 rearwardly, FIG. 1, with switch 112 reversing motor 86 to drive top portion 24 forwardly. However, the switch arrangement can be varied to the convenience of the user.

It is, therefore, apparent that the proper manipulation of switches 106 through 112 provide for universal positioning of top support portion 24 in its plane of movement and within its predetermined range of movement. For example, reading material disposed atop support portion 24 can be manipulated longitudinally and transversely, whereby words in a line of the printed material may be sequentially scanned by a properly positioned camera, and transmitted to a TV monitor for viewing in a greatly enlarged state. The printed material can be moved from line to line, when and as desired, by foot manipulation of the four switches 106 through 112. Both motors 70 and 86 may be of a constant or variable speed.

I claim:

1. A platform, for supporting various types of reading materials, for use in a visual aid system including a conventional type of camera for transmitting enlarged images of said printed material to a TV monitor, comprising,
  a tri-level platform including a generally rectangular flat plate base, intermediate and top portions including a top surface to support the reading material relative to the camera;
  first and second trolley means to respectively connect said intermediate portion to said base portion for reciprocating, longitudinal movement relative thereto, and said top portion to said intermediate portion for longitudinal movement therewith and reciprocating transverse movement relative thereto, said first trolley means comprising a pair of channel members, fixed respectively along front and rear longitudinal top edge portions of said base portion, and a pair of trolley rollers in a predetermined spaced apart relation engaged in each of said channels and suspended from confronting longitudinal bottom edge portions of said intermediate portion; said second trolley means comprising a second pair of channel members, fixed respectively along a pair of opposed transverse top edge portions of said intermediate portion, and a second pair of trolley rollers in a predetermined spaced apart relation, engaged in each of said transverse edge channels, suspended from respective confronting transverse edge portions of said top portion;
  a first reversibly electric gear motor, mounted to said base portion and including a pinion gear in driving engagement with a first gear rack, extending longitudinally along an underside of said intermediate portion to transmit relative longitudinal movement to said intermediate portion;
  a second reversible electric gear motor mounted to said base portion, and including a pinion gear in driving engagement with a second gear rack extending transversely along an underside of said top portion to transmit relative transverse movement to said top portion, said second gear rack being of a longitudinal width so as to accomodate said longitudinal movement of said intermediate portion;
  remote control means operably connected to said first and second gear motors.

2. The platform as defined in claim 1 wherein said remote control means comprises a switch box containing first and second pairs of reversing switches, respectively connected to said first and second reversible electric gear motors by means of electric leads connecting from an electric supply source to said pairs of switches and from said pairs of switches to the reversible gear motors through a flexible conduit.

3. The platform as defined in claim 1 including a longitudinal slot through said intermediate portion in a position to provide clearance for said second gear motor and its pinion gear, along the length of longitudinal travel of said intermediate portion.

4. The platform as defined in claim 1 including a plurality of support legs, fixed to and extending downwardly from a bottom side of said base portion.

5. The platform as defined in claim 1 including a hole through said base portion to accommodate the mounting of said first reversible electric gear motor.

* * * * *